UNITED STATES PATENT OFFICE 2,353,312

PROCESS OF MONOMERCURATING AROMATIC COMPOUNDS

Kenneth A. Kobe, Austin, Tex., and Thomas F. Doumani, Long Beach, Calif.

No Drawing. Application February 10, 1942, Serial No. 430,242

5 Claims. (Cl. 260—434)

This invention relates to an improved method for the manufacture of aromatic mercury compounds.

It is an object of this invention to produce aromatic monomercurated compounds free from contamination with di- and poly-mercurated compounds. It is a further object to produce aromatic monomercurated compounds substantially free from decomposed mercurating agent. A still further object is to produce directly aromatic monomercurated compounds of high purity and in high yields.

These aromatic monomercurated compounds are used widely in medicine as antiseptics, bacteriostatic agents, fungicides, germicides, disinfectants, and diuretics. They also are useful intermediates in the preparation of other aromatic compounds because of the many different chemical transformations they can undergo. Kobe and Doumani recently summarized these reactions and uses of aromatic mercury compounds in Industrial and Engineering Chemistry, volume 33, pages 170–176 (1940).

In this article, Kobe and Doumani also summarized the conditions reported by previous investigators for the mercuration of aromatic hydrocarbons, amines, phenols, acids and their anhydrides, nitro compounds, aryl halides, and heterocyclic compounds of an aromatic nature.

The general chemical reaction involved may be represented by the equation $$R \cdot H + Hg(OOCCH_3)_2 \longrightarrow R \cdot HgOOCCH_3 + CH_3COOH$$

where $R \cdot H$ is the aromatic compound to be mercurated. This compound can be an aromatic hydrocarbon or one of its substitution products. Typical of some of these are the mercuration reactions:

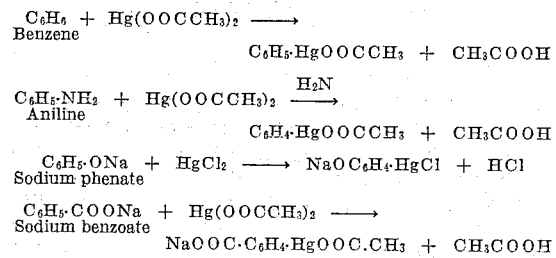

It is not implied that these are the only compounds that can be mercurated, as later examples will show, but merely representative of groups and mercurating agents. In addition, the alkyl and aryl substituted benzene hydrocarbon can be mercurated readily, as can the various derivatives of these aromatic hydrocarbons. Likewise, the heterocyclic compounds of aromatic nature, such as thiophene, furan, pyrrole, pyridine, and others, as well as their derivatives can be mercurated advantageously by our method.

Several mercurating agents can be used. The favorite is mercuric acetate which may be secured directly, or prepared by dissolving mercuric oxide in acetic acid. Other mercurating agents are mercuric chloride, mercuric oxide, either used directly or prepared in situ by addition of alkali to the solution containing mercuric acetate or chloride.

For numerous compounds the ease of di- and poly-mercuration is so pronounced that it is impossible to obtain satisfactory yields of monomercurated compounds according to the methods disclosed in the prior art. The formation of contaminating di- and poly-mercurated compounds with the monomercurated compound makes difficult, and sometimes impossible, the purification of the monomercurated compound. Furthermore, the formation of higher mercurated compounds consumes large amounts of the mercurating agent, necessitating their careful recovery because of the value of the mercury. This usually is accomplished by atmospheric distillation of these di- and poly-compounds, causing their decomposition to metallic mercury, which is recovered. This recovery is both costly and time consuming. Thus, it is particularly desirable to eliminate, or at least minimize, the formation of these higher mercurated compounds when monomercurated compounds are the ones sought.

As a result of mercurations of various aromatic compounds according to the methods of the prior art, we found that the reaction products invariably contained large amounts of di- and poly-mercurated compounds associated with the monomercurated compound, as well as reduction products of the mercurating agent, as mercurous compounds and free mercury. Thus, Bake (U. S. Patent 2,075,971) obtained from 16 to 75 per cent phenyl dimercury diacetate by his method. Rentschlor (U. S. Patent 2,050,018) devotes his entire method to separating the undesirable polymercury benzene compounds which can be regarded as impurities. Sharp (British Patent 406,725) obtains mainly polymercurated derivatives of toluene and cymene. Burtner (U. S. Patent 2,206,804) finds almost half his mercury as 2,5-dichlormercuri-furan instead of the desired 2-chloromercuri-furan.

Thus, it is a characteristic of methods old in the art to produce these contaminating polymercurated compounds with the desired monomercurated one. We, therefore, believed there was something fundamentally incorrect with the methods of the prior art and have carried out a large number of experiments on a variety of aromatic compounds in order to attain the objects recited for this invention.

We have found that aromatic compounds can be directly mercurated to give exclusively monomercurated compounds provided that a low concentration of the suitable mercurating agent is employed. This may be accomplished by employing the mercurating agent in a large volume of a suitable solvent; however, for many compounds the yield of monomercurated compound falls off when the large volumes of solvents necessary are employed. For this reason, and for economy, we prefer to avoid the use of large volumes of solvents, and instead, we employ a unique and fundamentally new method of mercuration. A particular feature of this method of mercuration is the manner in which we are able to maintain a low concentration of the mercurating agent during the entire process of mercuration. We have found by adding the mercurating agent to aromatic compounds at a rate sufficiently slow so that the mercurating agent is consumed as added, the resulting reaction product will consist almost exclusively of monomercurated compounds. For some compounds the rate of addition can be such that most of the mercurating agent is consumed by chemical reaction with the aromatic compound, but there still remains during the addition sufficient unreacted mercurating agent to maintain a low concentration of the mercurating agent, thus giving a product consisting only of monomercurated compound. If the concentration of the mercurating agent remains less than 0.05 gram moles (or gram formula weight) per liter the amount of di- and polymercurated compounds formed is usually negligible.

Further, we have observed for a large number of aromatic compounds that the mole ratio of aromatic compound to mercurating agent varies with each compound when the highest yield of monomercurated compound is to be obtained; however, for most compounds the ratio should exceed ten to obtain a product consisting only of monomercurated compound. When lower ratios are used in our method, there is a tendency to form poly-mercurated compounds, depending upon the nature of the particular compound, though the extent of poly-mercuration is much less than when other known methods are employed.

When carrying out the reaction by the addition of the mercurating agent to the aromatic compound, it is frequently convenient to dissolve the mercurating agent in a suitable solvent prior to its addition, instead of adding it directly. The advantages realized are more rapid reaction, easier control of the addition, and its rapid dissemination and dilution throughout the mercuration mixture. To obtain a suitable initial reaction temperature and to dissolve some aromatic compounds prior to mercuration, it is frequently desirable to employ some solvent with the aromatic compound. Aromatic compounds whose boiling points are excessively high can be mixed with a lower boiling liquid prior to the addition of the mercurating agent. This has the advantage of maintaining a practically uniform reflux temperature besides eliminating the need for mechanical stirring of the mixture. Furthermore, it prevents the decomposition of the mercurating agent because of the lower temperature which is maintained. The solvents used will depend primarily on the type of compound to be mercurated. The following are some of the suitable solvents: acetic acid and its anhydride, and higher alkyl acids, for hydrocarbon, nitro compounds and aryl halides; water, alcohols, glycols, and acetic acid for amines; water, alcohols and glycols for phenols, aromatic acids and their anhydrides.

The mercuric acetate used as a mercurating agent can be prepared by dissolving mercuric oxide in acetic acid.

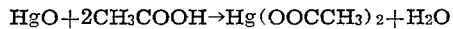

Frequently it is desirable to add sufficient acetic anhydride to react with the water formed in the reaction.

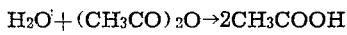

In this way the solvent can be maintained anhydrous.

This process of mercuration is general for the monomercuration of all types of aromatic compounds which have been mercurated according to the methods old in the art. These aromatic compounds include hydrocarbon, amines, phenols, aryl halides, nitro compounds, acids and their anhydrides, as well as the heterocyclic compounds of aromatic nature, such as thiophene, furan, pyrrole, pyridine and others, as well as their derivatives. By aromatic compounds we include not only the hydrocarbons and derivatives of monocyclic benzene and heterocyclic nuclei, but also those compounds formed from two or more benzene or heterocyclic rings. These rings can be fused together as with naphthalene and its substitution products and derivatives, or the aromatic rings can be singly linked together, as with diphenyl and its substitution products and derivatives.

Some examples of typical mercurations of aromatic compounds which illustrate the method invented are given and relate particularly to compounds with which previous workers had great difficulty in securing monomercurated compounds.

*Example I*

Ninety-nine milliliters (1.12 moles) of thiophene-free benzene and 12.5 ml. (0.218 mole) of glacial acetic acid were charged to a stainless-steel autoclave which was equipped with internal stirrer, means for admitting a solution of mercuric acetate in acetic acid under pressure, and provision for heating by external means. With the autoclave at 110° C., a solution of 12 g. (0.0555 mole) of mercuric oxide in 35 ml. (0.613 mole) of hot glacial acetic acid was added to the benzene-acetic acid solution at a rate of from 0.47 to 0.58 ml. per minute, a total time of from 60 to 75 minutes being required for the addition of 35 ml. of the solution. Heating at 110° C. and stirring were continued for an additional hour. After cooling the autoclave, its contents were examined for decomposed mercuric acetate as metallic mercury; none was found. Excess benzene was evaporated off and the remaining solution cooled and filtered. A negligible amount of solids as poly-mercurated benzene was found on the filter paper. The filtrate was treated with a solution of 10 g. of calcium chloride in 50 ml. of 95 per cent ethanol to convert the phenyl mercuric acetate to phenyl mercuric chloride. The yield was 16.0 g., 92 per cent, M. P. 246-9° C. Recrystallized from ethanol, M. P. 249-250° C.

*Example II*

Fouteen and seven-tenths grams of mercuric acetate (0.0463 mole) or equivalent mercuric oxide was dissolved in 25 ml. of warm glacial acetic acid and added dropwise during one hour to a boiling solution of 50 ml. of p-cymene and 25 ml. of glacial acetic acid. This mixture maintains an approximately constant boiling temperature of 120° C. To prevent the mercuric acetate from crystallizing from the acetic acid solution during its addition, a dropping funnel surrounded by hot water at 95° C. to 100° C. was used. The glacial acetic acid was initially mixed with the p-cymene in order to lower the reflux temperature and to maintain it constant. After the addition of all the mercuric acetate the resulting solution was refluxed for another hour.

The warm solution of mercurated p-cymene was first filtered from metallic mercury giving 0.08 g. then mixed with 10 g. of sodium bromide and steam distilled to remove the excess p-cymene. The excess of p-cymene and acetic acid may also be removed by distillation in vacuo. The crude product was filtered and air dried giving 17.1 g. (90% of the theoretical yield). This product consisted only of monomercurated cymylmercuric bromides and was completely soluble in benzene, ethanol, or acetone. The filtrate after steam distillation contained 1.32 g. of mercuric acetate (determined as the sulfide). This accounts for 99% of the mercuric acetate taken.

*Example III*

Fourteen and seven-tenths grams of mercuric acetate (0.0463 mole) or equivalent mercuric oxide was dissolved in 24 ml. of warm glacial acetic acid and added dropwise during one hour to a boiling solution of 29.8 g. (0.324 mole) of toluene and 25 ml. of glacial acetic acid. The mercuric acetate-acetic acid solution was added in the hot during one hour as described for Example 2, and the resulting reaction mixture refluxed an additional hour. Conversion to toluene mercuric bromides as described for Example 2 gave 14.6 g. of monomercurated compounds; yield 86% of the theoretical.

The foregoing description with examples is merely illustrative of the invention and various alternative procedures and proportions, variety of equipment, and other changes can be adopted by one skilled in the art without altering the essential features of the invention. We do not wish to be limited to the specific embodiments of the invention disclosed herein except to the extent set forth in the appended claims, which are to be interpreted as broadly as the state of the art will permit.

We claim:

1. A process for the monomercuration of aromatic compounds which comprises adding a mercurating agent to an aromatic compound at a sufficiently slow rate that the concentration of the mercurating agent in the reaction mixture does not exceed 0.05 gram-moles per liter.

2. A process for the monomercuration of aromatic compounds which comprises adding a mercurating agent dissolved in a solvent to the aromatic compound dissolved in a solvent at a rate sufficiently slow that the concentration of mercurating agent in the reaction mixture does not exceed 0.05 gram-moles per liter.

3. A process for the monomercuration of aromatic compounds which comprises adding mercuric acetate dissolved in acetic acid to aromatic compounds dissolved in acetic acid at a sufficiently slow rate that the concentration of mercuric acetate does not exceed 0.05 gram-moles per liter.

4. A process for the monomercuration of aromatic hydrocarbons which comprises adding mercuric oxide dissolved in acetic acid to the aromatic hydrocarbon in excess in the range 5 to 20 moles; the hydrocarbon being admixed with acetic acid in excess in the range of 5 to 10 moles; maintaining this reaction solution at a temperature in the range 110° to 160° C., said addition taking place in from one to four hours.

5. A process for the monomercuration of benzene which comprises adding mercuric acetate dissolved in acetic acid to benzene in excess in the range of 10 to 20 moles, this being admixed with acetic acid in excess in the range of 5 to 10 moles, maintaining this reaction solution at a temperature in the range 100° to 130° C., said addition taking place in from one to four hours.

KENNETH A. KOBE.
THOMAS FUZZY DOUMANI.